United States Patent
Barajas et al.

(10) Patent No.: US 7,558,771 B2
(45) Date of Patent: Jul. 7, 2009

(54) SYSTEM AND METHOD FOR SELECTION OF PREDICTION TOOLS

(75) Inventors: Leandro G. Barajas, Troy, MI (US); Pulak Bandyopadhyay, Rochester Hills, MI (US); Guoxian Xiao, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 458 days.

(21) Appl. No.: 11/448,964

(22) Filed: Jun. 7, 2006

(65) Prior Publication Data

US 2007/0288414 A1    Dec. 13, 2007

(51) Int. Cl.
G06F 17/00    (2006.01)
G06N 5/02    (2006.01)

(52) U.S. Cl. .............................. 706/46; 706/10; 706/14

(58) Field of Classification Search .................. None
See application file for complete search history.

(56) References Cited

U.S. PATENT DOCUMENTS

| | | | |
|---|---|---|---|
| 2005/0071143 A1* | 3/2005 | Tran et al. ...................... 703/11 |
| 2005/0096963 A1* | 5/2005 | Myr et al. ...................... 705/10 |
| 2006/0095521 A1* | 5/2006 | Patinkin ...................... 709/206 |
| 2006/0155486 A1* | 7/2006 | Walsh et al. .................. 702/32 |
| 2006/0178918 A1* | 8/2006 | Mikurak ......................... 705/7 |
| 2006/0184460 A1* | 8/2006 | Cleary ........................... 706/12 |
| 2006/0253296 A1* | 11/2006 | Liisberg et al. ................. 705/1 |

OTHER PUBLICATIONS

Palisade—RISK_0501PE.pdf, downloaded from http://www.palisade.com/downloads/pdf/Palisade_RISK_0501PE.pdf on May 16, 2006.
Products.pdf, downloaded from http://www.compsim.com/products.html on May 17, 2006.

* cited by examiner

*Primary Examiner*—Joseph P Hirl

(57) ABSTRACT

A system and method for data analysis are disclosed. Data analysis may include a step of filtering the data to produce filtered data. The method may include processing a plurality of prediction algorithms to produce prediction values, the prediction values having associated historical and expected prediction confidence intervals. The method may also include evaluating performance of the prediction algorithms to generate performance indexes, the performance indexes having associated index confidence intervals. The method may also include generating relevance values of the prediction algorithms based on the performance indexes, and index confidence intervals. The method may further include applying the relevance values and prediction confidence intervals to determine how to combine prediction values, and applying multi-variable data fusion to combine the prediction values. The form of output of the data analysis may be chosen from a list of output options, including predictions, reports, warnings and alarms, and other forms of reporting.

20 Claims, 5 Drawing Sheets

| Event Code | Priority | | | | Feature | | | Prediction Confidence | Is it accur. Predicted |
|---|---|---|---|---|---|---|---|---|---|
| | Overall | Freq. | MTTR | DTM | DTM | MTTR | Freq. | | |
| ■■■■ | 1 | 15 | 5 | 4 | 24:19:27 | 0:19:28 | 75 | 60.1% | TRUE |
| EV2■■ | 2 | 13 | 14 | 9 | 15:52:21 | 0:12:13 | 78 | 85.0% | TRUE |
| EV2532 | 3 | 20 | 8 | 10 | 14:29:45 | 0:15:49 | 55 | 93.7% | TRUE |
| ■■■■ | 4 | 10 | 20 | 12 | 14:16:47 | 0:09:19 | 92 | 81.8% | TRUE |
| ■■■■ | 5 | 16 | 15 | 11 | 14:26:00 | 0:11:33 | 75 | 66.9% | TRUE |
| EV2■■ | 6 | 8 | 21 | 7 | 19:50:09 | 0:09:09 | 130 | 60.5% | TRUE |
| EV1750 | 7 | 18 | 16 | 14 | 10:36:16 | 0:10:26 | 61 | 84.9% | TRUE |
| EV1191 | 8 | 3 | 33 | 3 | 42:16:32 | 0:04:02 | 628 | 33.6% | FALSE |
| EV13 | 9 | 1 | 34 | 1 | 88:20:07 | 0:03:55 | 1351 | 75.0% | TRUE |
| EV1514 | 10 | 11 | 25 | 17 | 8:07:52 | 0:06:06 | 80 | 73.1% | TRUE |
| EV1 | 11 | 35 | 2 | 16 | 9:53:24 | 0:28:15 | 21 | 12.4% | FALSE |
| EV2014 | 12 | 6 | 32 | 13 | 11:59:34 | 0:04:04 | 177 | 70.7% | TRUE |
| EV193 | 13 | 25 | 12 | 20 | 7:05:13 | 0:12:53 | 33 | 37.3% | FALSE |
| EV1566 | 14 | 32 | 6 | 18 | 7:56:56 | 0:19:05 | 25 | 96.7% | TRUE |
| EV1152 | 15 | 7 | 31 | 15 | 10:27:56 | 0:04:15 | 148 | 87.8% | TRUE |
| EV2241 | 16 | 36 | 4 | 19 | 7:16:43 | 0:22:59 | 19 | 25.7% | FALSE |
| EV1013 | 17 | 5 | 36 | 8 | 19:41:54 | 0:03:38 | 325 | 62.2% | TRUE |
| EV1015 | 18 | 30 | 10 | 22 | 6:15:06 | 0:14:26 | 26 | 66.7% | TRUE |
| EV1098 | 19 | 33 | 9 | 24 | 5:29:57 | 0:15:00 | 22 | 54.7% | FALSE |
| EV1513 | 20 | 2 | 40 | 2 | 45:19:08 | 0:03:04 | 889 | 17.8% | FALSE |
| EV94 | 21 | 37 | 7 | 25 | 5:27:56 | 0:17:16 | 19 | 84.6% | TRUE |
| EV612 | 22 | 44 | 1 | 6 | 19:58:47 | 1:14:55 | 16 | 84.9% | TRUE |
| EV1014 | 23 | 4 | 41 | 5 | 22:53:29 | 0:02:58 | 464 | 71.5% | TRUE |
| EV44 | 24 | 24 | 23 | 30 | 4:05:25 | 0:06:38 | 37 | 89.1% | TRUE |
| EV1532 | 25 | 19 | 26 | 23 | 5:48:08 | 0:06:00 | 58 | 69.8% | TRUE |
| EV1670 | 26 | 23 | 24 | 29 | 4:08:31 | 0:06:22 | 39 | 80.9% | TRUE |
| EV514 | 27 | 12 | 35 | 26 | 5:00:31 | 0:03:45 | 80 | 77.8% | TRUE |
| EV695 | 28 | 46 | 3 | 21 | 6:52:09 | 0:27:29 | 15 | 63.6% | TRUE |
| EV622 | 29 | 31 | 18 | 28 | 4:17:44 | 0:09:55 | 26 | 37.3% | FALSE |
| EV14 | 30 | 21 | 29 | 27 | 4:17:44 | 0:05:09 | 50 | 97.8% | TRUE |
| | | | | Predicted | 345:12:50 | 0:05:58 | 3476 | 67% | 23 |
| | | | | Pred. % | 49% | 87% | 56% | 78% | 77% |
| | | | | TOTAL | 703:25:18 | 0:06:50 | 6182 | 6182 | 30 |

| Hist | Pred 2 | Pred 1 |
|---|---|---|
| Pred 3 | Pred 2+3 | Pred 1+3 |

*FIG. 6*

SYSTEM AND METHOD FOR SELECTION OF PREDICTION TOOLS

TECHNICAL FIELD

A data analysis tool is disclosed. More particularly, this disclosure relates to selection of appropriate data analysis algorithms for generating predictions.

BACKGROUND

Widespread use of computers, processors, and controllers results in the generation of large amounts of data. In financial, manufacturing, and computer networking industries, to name a few, data regarding transactions, operations and performance of devices may be gathered and typically written to databases. Accordingly, data may be analyzed by data analysis tools to provide bases for production planning, operations analysis and/or improvement, and fine tuning of devices or machines.

An application for data analysis can be used to analyze gathered data. The application may be tailored to the type of data gathered. For example, discrete data, such as for example, event counts, may be analyzed in one particular way by an application. As another example, continuous-valued data, for example, event durations, may be analyzed in another way, and perhaps by a different application altogether.

An application may be adapted to produce output in the form of a probability or probabilities, for example, "there is a 75% chance of rain tomorrow." Another application may produce output in the form of a prediction of a value, with an associated confidence for the value. A value may be in the form of a number, for example, $23.95, or may be in the form of a class, for example, severity or impact of an event. There may be, for example, three classes: mild, medium, or severe.

Typically separate applications are utilized for data analysis according to the type, size, or other characteristic of the data set. It would be useful to have a tool that can select, apply, and combine different data analysis tools to produce output according to a variety of output options.

SUMMARY

Disclosed herein are a method, system and apparatus for filtering data and selecting prediction algorithms to generate signal characterization and predictions based on different estimation tools. Input data may be provided through a real-time data acquisition system, and may also be retrieved from a database. The data series may therefore include both historical data and recently and/or currently generated data. An optimal predictor or a combination of several of them for a specific fault code or event code may be selected based on the nature of the required forecasting. If necessary different estimations may be combined by performing multivariable sensor fusion. Output can be generated in the form of reports including short and long term predictions.

BRIEF DESCRIPTION OF THE DRAWINGS

FIG. 6 shows how faults may be prioritized in an embodiment of the system and method described herein.

DETAILED DESCRIPTION OF THE INVENTION

Described herein are a method, system and apparatus for data analysis that may select, apply, and combine different data analysis tools to produce outputs according to a variety of output options. Data for analysis may be obtained through a real-time data acquisition system, and/or may be retrieved from a database. Analysis of the data may include a step of filtering the data to produce filtered data. One or a plurality of prediction algorithms may be selected. The method may include a step of applying the one or more prediction algorithms. In one embodiment a first prediction method may be applied to the filtered data to obtain a first prediction. A second prediction method may also be applied to the filtered data, to obtain a second prediction. The method may further include a step of applying multivariable data fusion to combine the first prediction and the second prediction. The form of output of the data analysis may be chosen from a list of output options, including predictions, reports, warnings and alarms, and other forms of reporting.

In one embodiment, the method includes processing a plurality of prediction algorithms to produce prediction values, the prediction values having associated prediction confidence intervals. The prediction algorithms may also be referred to herein as prediction models. The method may also include evaluating performance of the prediction algorithms to generate performance indexes, the performance indexes having associated index confidence intervals. The performance of the prediction algorithms or models may be based on historical or current data. The method may also include generating relevance values of the prediction algorithms based on the performance indexes and index confidence intervals. The method may further include applying the relevance values and prediction confidence intervals to determine how to combine prediction values. The method may include applying multivariable data fusion to combine the prediction values, and producing output.

This invention may be embodied in the form of any number of computer-implemented processes, operations, and apparatuses for practicing those processes. Embodiments of the invention may be in the form of computer program code containing instructions embodied in tangible media, such as floppy diskettes, CD-ROMs, hard drives, or other similar computer-readable storage medium, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 1:
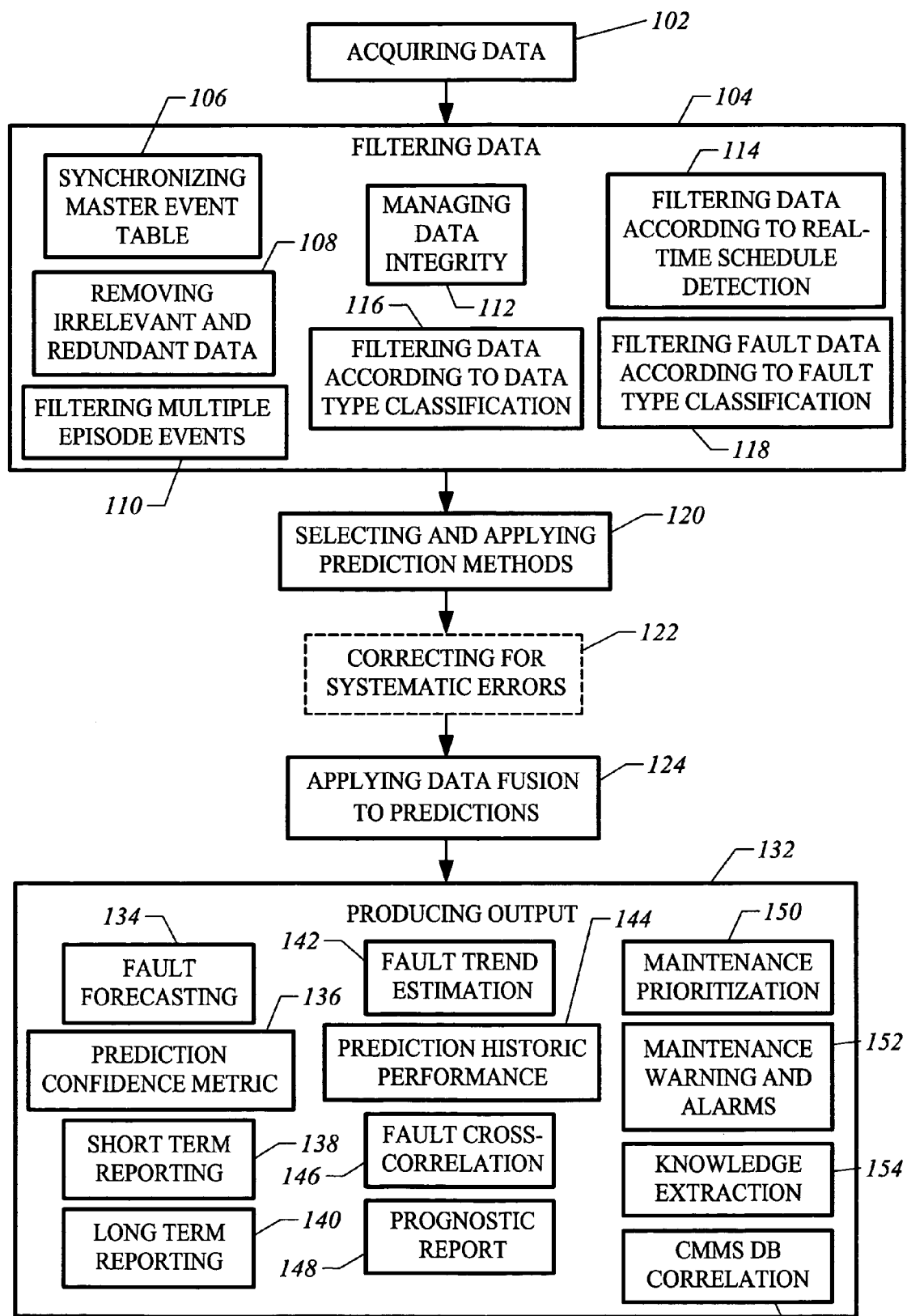
FIG. 1 is a flow chart of an embodiment of the method described herein including filtering the data and then selecting and applying one or more prediction algorithms for data analysis and predictions.

FIG. 1 is a flow chart of an embodiment of the method described herein including filtering the data and then selecting and applying one or more prediction algorithms for data analysis and predictions and producing output according to a variety of output options. Data for analysis may be acquired in a step 102. In one embodiment, the data may be fault data, as may be produced by machine controllers in the course of operations of a production plant, or by a data acquisition system inside a vehicle (car, airplane, etc). It is understood that data as discussed herein is not limited to production data or fault data but may include, for example, alarm sequences in a telecom network, transaction logs in a grocery store, web navigation history, genome sequence data, stock market or other financial transactions data, line status logs in a manufacturing plant or other log data from manufacturing systems, time-stamped warranty data, diagnostic data from automobiles, and customer relations data.

A step of filtering the data to produce filtered data is shown at 104. In this way, separate applications for type, size, or other characteristics of the data may be avoided. The step of filtering the data 104 may be automated or may be under user direction. Filtering data step 104 may be performed by any suitable filtering method and may include synchronizing a master event table 106 to facilitate classifying and characterizing events. Filtering step 104 may further include removing irrelevant and redundant data 108, and/or filtering multiple episode events 110. Irrelevant data may include, for example, short duration events. An event whose duration is 0.1 sec, for example, may not be relevant enough for maintenance consideration in a production facility. Redundant data may include, for example, a recurring fault code emitted by the machine controller at regular short intervals, such as every 6 seconds, due to a failure to properly eject a workpiece. Irrelevant data may also include timeouts and idle time events. A timeout may be due to, for example, a power outage, whether planned or unplanned. Idle time may occur when no workpieces are available for a machine. This may occur for example, when a buffer from which the machine draws workpieces for processing is empty. Idle time may also occur for example, when a machine is shut down for a team meeting, training, or other reasons relating to personnel. Multiple episode events may be filtered for special treatment, such as for example, evaluating a total count of the episodes.

Filtering data step 104 may also include managing data integrity 112. For instance, a data record may be incomplete for some reason, such as for example, a loss of power to a sensor or processor. Data records may be incomplete or otherwise possibly corrupt for other reasons as well. In the step of managing data integrity 112, data records lacking sufficient data integrity may be omitted from subsequent processing. A user may be alerted to data integrity problems.

Filtering step 104 may also include a step 114 of filtering the data according to real-time schedule detection. Configuration changes to a section of a production line may be made to accommodate production schedules. When the configuration changes include modifications to, or maintenance on, a particular machine, filtering or selection of fault data relating to that machine may aid maintenance prioritization. Maintenance prioritization will be discussed in further detail below, in connection with FIG. 6. It is further understood that real-time schedule detection may be enabled, for example, through an interface to production management software.

Step 104 of filtering the data may instead or in addition include filtering the data according to data type classification 116, and in a particular embodiment, filtering fault data according to fault type classification 118. In step 116, data may be aggregated into classes according to a predetermined classification scheme. As an example, a bank ATM transaction data classification scheme may include a class for withdrawals, a class for deposits, a class for balance inquiries, a class for transfers between accounts, and other classes. As another example, for machine fault data in a production facility, a classification scheme may include a class for electrical faults, a class for hydraulic faults, and a class for pneumatic faults, as well as other classes, for example, classes associated with fault severity. It is understood that other classification schemes, including other or alternative classes, may be utilized. It is also understood that additional filtering methods that may be employed are included within the scope of the present disclosure.

Filtering steps 116 and 118 may further include interaction with a database (see 514, FIG. 5) a portion of whose configuration may reflect production system hierarchy, for example, whether parallel or serial production lines, station, buffer, and zone structures, and other structural features of the production system or other system whose data may be subject to analysis by the methods disclosed herein. The database configuration may further include a master list of fault codes, type classes, or data type classes. The database may be configured to synchronize fault type classifications and/or data type classifications to the master list as well as to the master event table 108 as well as to other relevant portions of the system.

To further facilitate filtering the data, the database may be further configured to process classification keywords using a keyword classification table. A keyword may provide a clear indication of for example, an electrical type of failure (e.g., Solenoid) even when the complete syntactic meaning of the fault or event code denotes another kind of event. Also, it is possible that an event may be classified in several classes simultaneously. In a generic case classifying an event in several classes simultaneously may be possible. In addition, the database may be configured for alerts. Particular alerts such as weekly or specific alerts may be configured. Certain alerts may be predefined, such as weekly alerts.

As previously mentioned, the embodiment of FIG. 1 can include selecting and applying one or more prediction algorithms. The prediction algorithms may also be described herein as prediction methods, predictors, or prediction tools. A step of selecting and applying one or more prediction methods is shown at 120. The step 120 is discussed in more detail referring to FIG. 2. In particular, step 120 can include processing a plurality of prediction algorithms to produce prediction values, the prediction values having associated prediction confidence intervals. The prediction confidence intervals may also be produced by the prediction algorithms. Step 120 can further include evaluating performance of the prediction algorithms, based on historical or current data, or both, to generate performance indexes. Historical data can include data from the previous year, the previous week, the previous ten minutes, or from any other time period precedent to the current time. A prediction algorithm can also be evaluated based on an expected performance of the particular prediction algorithm. Associated performance index confidence intervals may also be generated through the performance evaluation. The selecting and applying step 120 can further include generating a relevance value of the prediction algorithm based on the performance index and index confidence interval.

In an embodiment, a prediction algorithm can produce a prediction function. For example, the prediction algorithm can employ curve fitting techniques to predict one or more future values of a variable based on fitting a temporal sequence of past values to a particular functional form. Confidence bounds on the prediction function may provide for generation of performance indexes and confidence intervals. In this example, evaluation of the prediction function at particular future times may be used to generate prediction values. It is understood that other applications of curve fitting and other functional prediction techniques may be used to produce prediction functions. It is understood that application of functional prediction techniques is not limited to temporal sequences.

The step of selecting and applying one or more prediction algorithms 120 may be automated or may be under user direction. For example, each algorithm appropriate to particular data may be applied to historical or current data, and the accuracy of the prediction values produced by the prediction algorithms assessed over a long period of time. In an embodiment, the accuracy may be assessed by iteratively evaluating the performance of the prediction algorithms in a moving window. Each prediction algorithm may be assigned a probability of correctly predicting a specific fault. Each prediction algorithm can also be assigned a confidence interval associated with the prediction and its probability. Furthermore, a relevance value may be generated for each predictor, as will be discussed below in connection with FIG. 2. Additional details of prediction method selection will be discussed below in connection with FIG. 3.

Systematic error in the prediction values may be corrected in an optional step 122. For example, if a particular prediction algorithm on average under-estimates downtime by 10%, future prediction values produced by that prediction algorithm may be corrected by such amount. Accordingly, the prediction values may be corrected based on historical data and on expected model prediction accuracy. The correction may be applied by a technique analogous to proportional control in control theory, so that the bias error may be eventually removed. In order to improve control of the production system, or other system whose data may be subject to analysis by the methods disclosed herein, a proportional integral derivative (PID) type of controller or any of its variations can be also implemented both to improve the speed of response and reduce the steady state error.

The process producing the signal to be analyzed may behave in a non-linear way. If the production system or other system whose data may be subject to analysis by the methods disclosed herein behaves in a highly non-linear way, it may be necessary to use a more appropriate controller like one based on Feedback Linearization, Back Stepping, Sliding Mode, Singular Perturbations, or a modified Lyapunov Method. In general, non linear systems do not follow the principle of superposition (linearity and homogeneity). Non-linear systems may have multiple isolated equilibrium points. They may exhibit properties such as possession of a limit-cycle, bifurcation, and chaos. For a sinusoidal input, the output signal of a non-linear system may contain many harmonics and sub-harmonics with various amplitudes and phase differences (a linear system's output will only contain the sinusoid at the input).

In addition to mean error, mean variance and min/max (bound) type measurements can be calculated and used as correction or determining factors for prediction improvement. Another approach to the problem is to use a Kalman filter or an extended Kalman filter to track the performance of the prediction algorithm and generate a correction factor or even directly estimate the next prediction value by using state-space representation types of models.

Continuing now with discussion of step 120, it may in addition include selecting a first prediction method, and may include subsequently selecting a second prediction method. In another embodiment a third prediction method may also be selected. As discussed below in more detail in connection with FIG. 3, the prediction methods may include time-frequency analyzers, wavelet analyzers, curve fitting tools, auto-regressive models, neural networks and fuzzy logic models, temporal data mining methods, frequent episode discovery methods, and Bayesian reasoning or Markov model methods. It is also understood that additional prediction methods that may be employed are included within the scope of the present disclosure. For example, one choice of a default predictor can be implemented by using the previous known historical value of the variable to be predicted as the most likely value for the next prediction cycle. Particularly in cases where nothing else may be known, use of a default predictor as just described may yield much better results than just assuming that the value of the variable is going to have an arbitrary value, such as zero, for example.

Step 120 may further include applying the one or more prediction algorithms or methods, either in an automated manner or under user direction. In the embodiment of FIG. 1 a first prediction method may be applied to the filtered data to obtain a first prediction. A second prediction method may also be applied to the filtered data, to obtain a second prediction. In another embodiment a third prediction method may be applied to the filtered data to obtain a third prediction. It is understood that there can be embodiments in which any desired number of prediction methods may be applied to the filtered data to obtain predictions.

The embodiment of FIG. 1 may also include a step 124 of applying multivariable sensor or data fusion to combine the first prediction and the second prediction. In this disclosure the terms sensor fusion and data fusion may be used interchangeably. It is understood that in embodiments in which more than two prediction methods may be applied to the filtered data, multivariable sensor fusion may be applied to combine all the available predictions, taking account of their respective confidence values or uncertainties. The step 124 of applying data fusion will be discussed in further detail below in connection with FIG. 4.

A step of producing output according to a variety of output options is shown at 132. The step of producing output 132 may be automated or may be under user direction. The step of producing output 132 may include choosing from a list of output options including a fault forecasting report 134, a prediction confidence metric report 136, a short term prediction report 138, a long term prediction report 140, fault trend estimation 142, a historical prediction performance report 144, a fault cross-correlation report 146, a prognostics report 148, a maintenance prioritization report 150, maintenance warning and alarms 152, and knowledge extraction 154.

The output option of a fault forecasting report 134 may include a summary of all current predictions. For example, the top five predictions in terms of total downtime may be listed. A prediction confidence metric report 136 may include summary data, across all prediction algorithms or a subset thereof, on how well a particular fault may be predicted. The prediction confidence metric report may also or instead include summary data, across all faults or a subset of faults, on how well a particular prediction algorithm performs in predicting faults.

The output option of a short term prediction report 138 may include fault predictions for an upcoming time period ranging from the next day to the next seven days, for example. A short term prediction report may also be considered an operational report, anticipating reactive maintenance activities. A long term prediction report 140 typically addresses upcoming time periods longer than one week. A long term prediction report may be suitable for supply chain or strategic planning purposes. A long term prediction report includes predictions aggregated over longer time periods than a short term prediction report, and may also be aggregated over the entire manufacturing facility The output option of a fault trend estimation output 142 may be typically produced on a graphic user interface on a display device. In this way a user may better perceive trends. Fault trend estimation may be done for an individual prediction algorithm, a single fault, or a combination of prediction algorithms and/or a combination of faults.

The output option of a historical prediction performance report 144 may summarize how good a prediction algorithm has performed, historically. Generally a historical prediction performance report is a less detailed report than a prediction confidence metric report, and is directed to providing a picture of the entire prediction process at a higher level. For example, a historical prediction performance report may include data broken down into fault severity categories, that is, with what accuracy the prediction algorithms may predict serious faults vs. the accuracy for predicting medium faults, The output option of a fault cross-correlation report 146 may provide an indication of whether one particular fault may cause or contribute to the occurrence of another fault. A prognostic report 148 may include a summary of all the reports previously described. A maintenance prioritization report 150 provides an indication of what the high priority faults may be. Maintenance prioritization is discussed in more detail below in connection with FIG. 6.

The step of producing output 132 may in addition include correlation with a Computerized Maintenance Management System (CMMS) database 156. It is understood that output in the form of additional and/or other reports or formats are included within the scope of the present disclosure.

Figure 2:
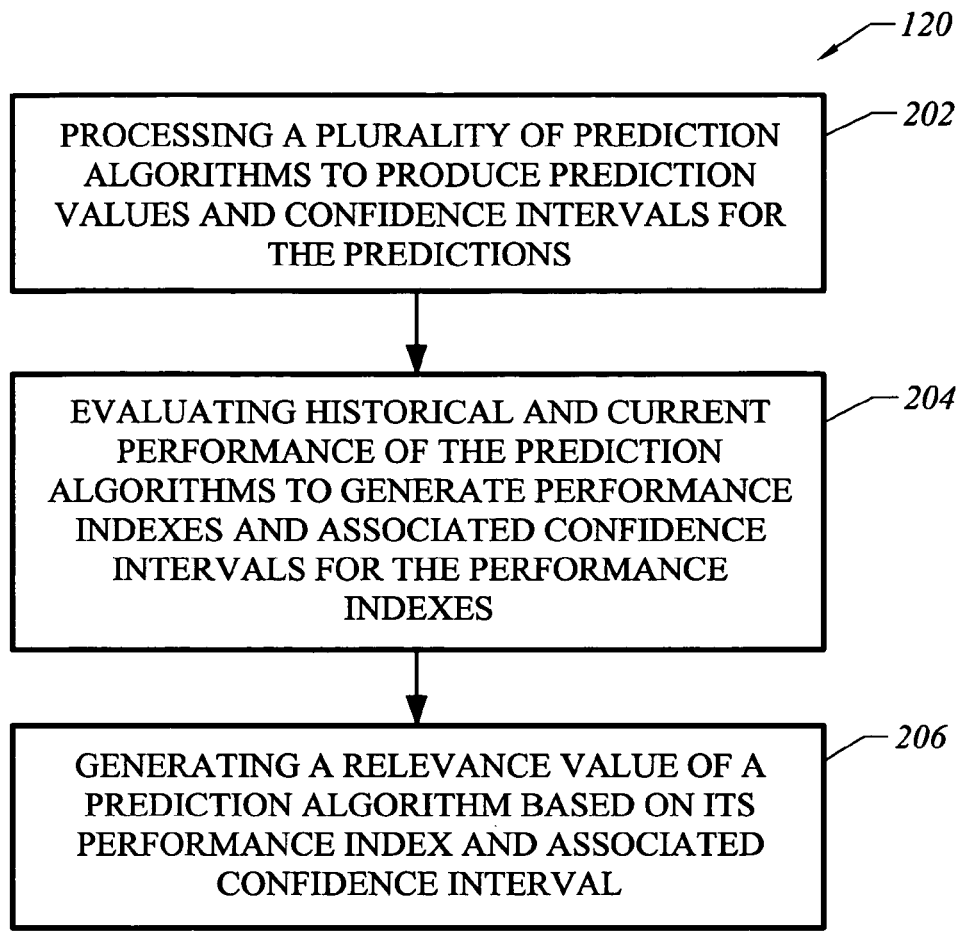
FIG. 2 shows further detail of the selecting and applying step of the embodiment of FIG. 1.

Turning now to FIG. 2, further details of the step of selecting and applying prediction methods (120, FIG. 1) are shown. Processing a plurality of prediction algorithms may take place in a step 202. The processing may produce prediction values and associated confidence intervals for the predictions. For example, a particular prediction algorithm may predict a total downtime of 140 minutes for a certain fault. The prediction algorithm may further predict a confidence interval for the prediction: with 95% confidence the downtime will lie between 110 minutes and 155 minutes, for example.

The performance of the prediction algorithms may be evaluated in a step 204. The evaluation may draw upon historical or current fault or event data, for example form a real-time data acquisition system (see 512, FIG. 5). Evaluation of the performance may provide for generating performance indexes for the prediction algorithms. The evaluation may also generate associated confidence intervals for the performance indexes. The performance index confidence intervals are distinct from the confidence intervals for the predictions discussed above. A performance index confidence interval may be generated by iteratively evaluating or assessing the performance of the prediction algorithm in a moving window using historical data, as previously mentioned. The performance index confidence interval is a metric for how well, based on previous performance, the prediction algorithm can be expected to be accurate.

A relevance value for one or more of the prediction algorithms may be generated 206. The relevance value may be based on the performance index of the prediction algorithm, and on the associated confidence index of the performance index. The relevance value may be used in further processing of the prediction values, as discussed below in connection with FIG. 4.

Figure 3:
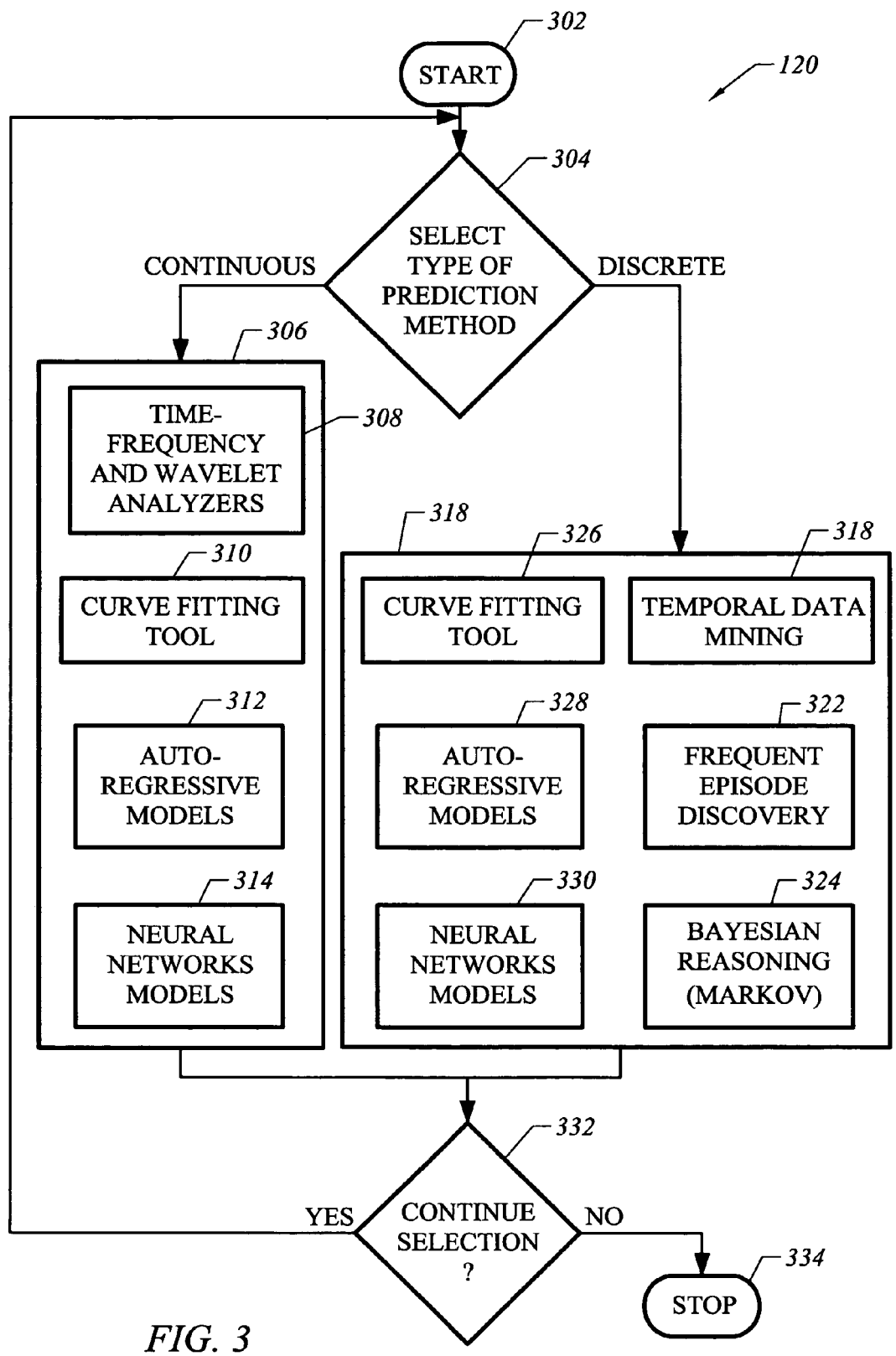
FIG. 3 shows further details of the selecting and applying step of an embodiment.

Turning now to FIG. 3, further detail of the selecting and applying step 120 of the embodiment of FIG. 1 for generating prediction values is shown. After a start 302, a decision may be made as to whether to select a continuous or discrete prediction method 304. Continuous and discrete may refer to time, and temporal values, or may refer to another signal or data quality, such as amplitude. One of several continuous prediction methods may be selected 306. The continuous prediction methods may include time-frequency analyzers and wavelet analyzers 308, a curve fitting tool 310, auto-regressive models 312, and neural networks models 314. The continuous prediction methods may further be selected in step 306 based on historical performance as may be recorded for example in a database. The selection step 306 may include retrieving performance metrics for the continuous prediction methods from a database. It is understood that additional continuous prediction methods and/or models may be included in selection 306. A decision whether to select an additional method may be made 332. If yes, step 304 may be repeated. If no, the selecting step may terminate 334.

Returning to discussion of decision 304 whether to select a continuous or discrete prediction method, one of several discrete prediction models 318 may be selected. The methods may include temporal data mining methods 320, a frequent episode discovery method 322, Bayesian reasoning models (e.g., Markov models) 324, a curve fitting tool 326, auto-regressive models 328, and neural networks models 330. The methods/models 326, 328, and 330 are analogs to the methods and/or models 310, 312, and 314, but may be specially adapted for discrete prediction. The discrete prediction methods may further be selected in step 318 based on historical performance as may be recorded for example in a database. The selection step 318 may include retrieving performance metrics for the discrete prediction methods from a database. It is understood that additional discrete prediction methods and/or models may be included in the several discrete prediction models 318. As discussed above, a decision whether to select an additional method may be made 332.

Figure 4:
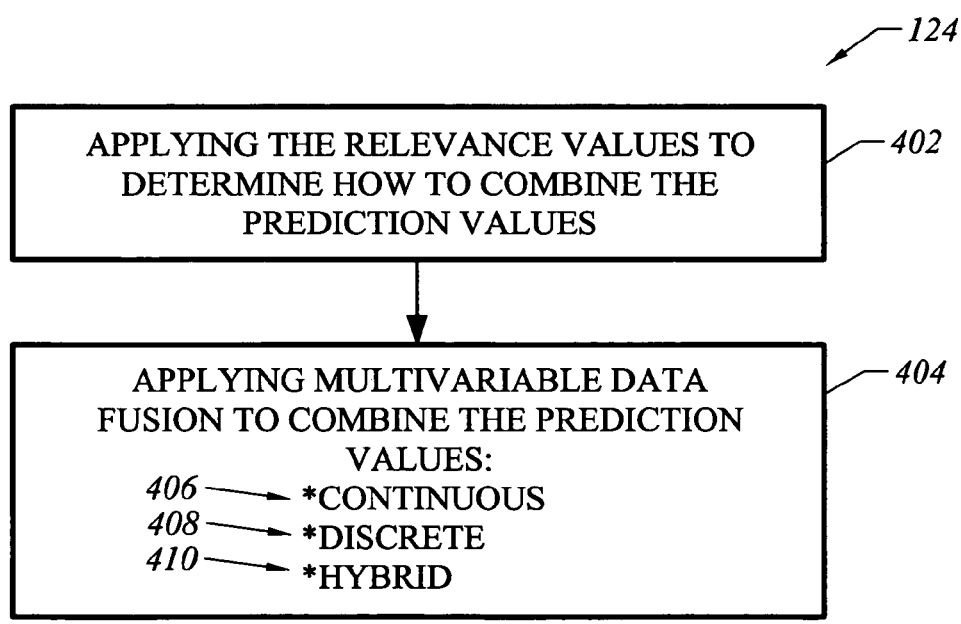
FIG. 4 shows further details of the step of applying data fusion of FIG. 1.

Turning now to discussion of FIG. 4, further detail of applying data fusion to the predictions (see 124, FIG. 1) is shown. As previously discussed, a relevance value of a prediction algorithm may be generated (see 206, FIG. 2). The relevance value may be based on the performance index of the prediction algorithm and an associated performance index confidence interval. In a step 402, the relevance values may be applied to determine how to combine the prediction values. For example, a prediction algorithm with a high relevance value may be given higher weighting than a prediction algorithm with a low relevance value.

Multivariable data fusion may be applied 404 to combine the prediction values, based on the determination made in step 402. As just mentioned, the determination may provide a weighting for combining prediction values. In multivariable data fusion, data from different sources or of different types may be amalgamated, with account taken of associated uncertainties for each data source or data type. The application of multivariable data fusion 404 can improve prediction accuracy by combining predictions made with different prediction methods. In particular, a first prediction algorithm may produce a first prediction value of a first particular type and having a first magnitude of error, and a second prediction algorithm may produce a second prediction value of a second particular type and having a second magnitude of error. Applying multivariable sensor fusion includes combining the first prediction value of the first particular type and the second prediction value of the second particular type to produce a combined prediction value having a combined magnitude of error less than the first magnitude of error and less than the second magnitude of error.

For example, the first prediction may be a continuous-valued first prediction 406 having a first magnitude of error and the second prediction may be a discrete-valued second prediction 408 having a second magnitude of error. Applying multivariable data fusion to combine the first prediction and the second prediction may include combining the continuous-valued first prediction and the discrete-valued second prediction to produce a combined prediction having a combined magnitude of error less than the first magnitude of error and less than the second magnitude of error. For example, a Kalman filtering algorithm can be used to accomplish the multivariable data fusion. Of course it is understood that two continuous-valued predictions may be combined to produce a combined prediction. It is further understood that two discrete-valued predictions may be combined to produce a combined prediction. The step of applying multivariable data fusion 404 may be automated or may be under user direction.

As another example of multivariable data fusion, the first prediction may be a numerical value having a first confidence and the second prediction may be a probability distribution of a variable having a second confidence. Applying multivariable data fusion to combine these two predictions may include combining the numerical value and the probability distribution to produce a combined prediction having a combined confidence greater than the first confidence and greater than the second confidence. As yet another example, the first prediction may a temporal prediction having a first confidence and the second prediction may be a probability distribution having a second confidence. Applying multivariable data fusion may include combining the temporal prediction and the probability distribution to produce a combined prediction having a combined confidence greater than the first confidence and greater than the second confidence. Step 404 may further include combining a third prediction with the first and the second predictions.

As another example of multivariable data fusion, the first prediction may be a numerical value having a first confidence and the second prediction may be a membership function of a categorical variable having a second confidence. An example of a categorical variable is one which can represent attributes such as colors red, green and blue (RGB) or sensations HOT, MEDIUM, and COLD. An example membership function may be (HOT, 0.5; MEDIUM, 0.3; COLD, 0.2). Membership functions are widely used in fuzzy logic. A membership function may have an associated confidence. Applying multivariable data fusion to combine these two predictions may include combining the numerical value and the probability distribution to produce a combined prediction having a combined confidence greater than the first confidence and greater than the second confidence.

As another example of multivariable data fusion, some data may be a hybrid 410 of continuous and discrete data, such as for example, data associated with machine faults in a production facility. Such data may include a count of faults associated with a specific fault code, and may in addition include a duration for each fault event. Summing the durations and dividing by the count may combine the hybrid data into a mean-time-to-repair (MTTR). Other examples of hybrid data which include counts and associated quantities may include financial transaction data and computer network traffic data. Often, the data in these examples may be considered temporal data, related to variables that are continuous or discrete in time.

In another application of multivariable data fusion, variables that are continuous in amplitude may be fused or combined with variables that are discrete in amplitude. For example, a system may include a temperature sensor whose output may be in degrees Celsius, to the nearest degree, and a hydraulic pressure sensor whose output may be a voltage proportional to the pressure applied to the sensor. It is understood that the multivariable sensor or data fusion method discussed in the present disclosure can be adapted both to combine variables continuous and discrete in amplitude and to combine variables continuous and discrete in time.

The method of FIGS. 1-4 may be utilized for analysis of data from diverse sources to produce output according to a variety of output options. One specific area of application includes manufacturing and production, in particular in a facility in which many production machines are equipped with processors or controllers. The processors or controllers may monitor machine status or states. Further details of a system and apparatus for application to a production facility are shown in FIG. 5.

Figure 5:
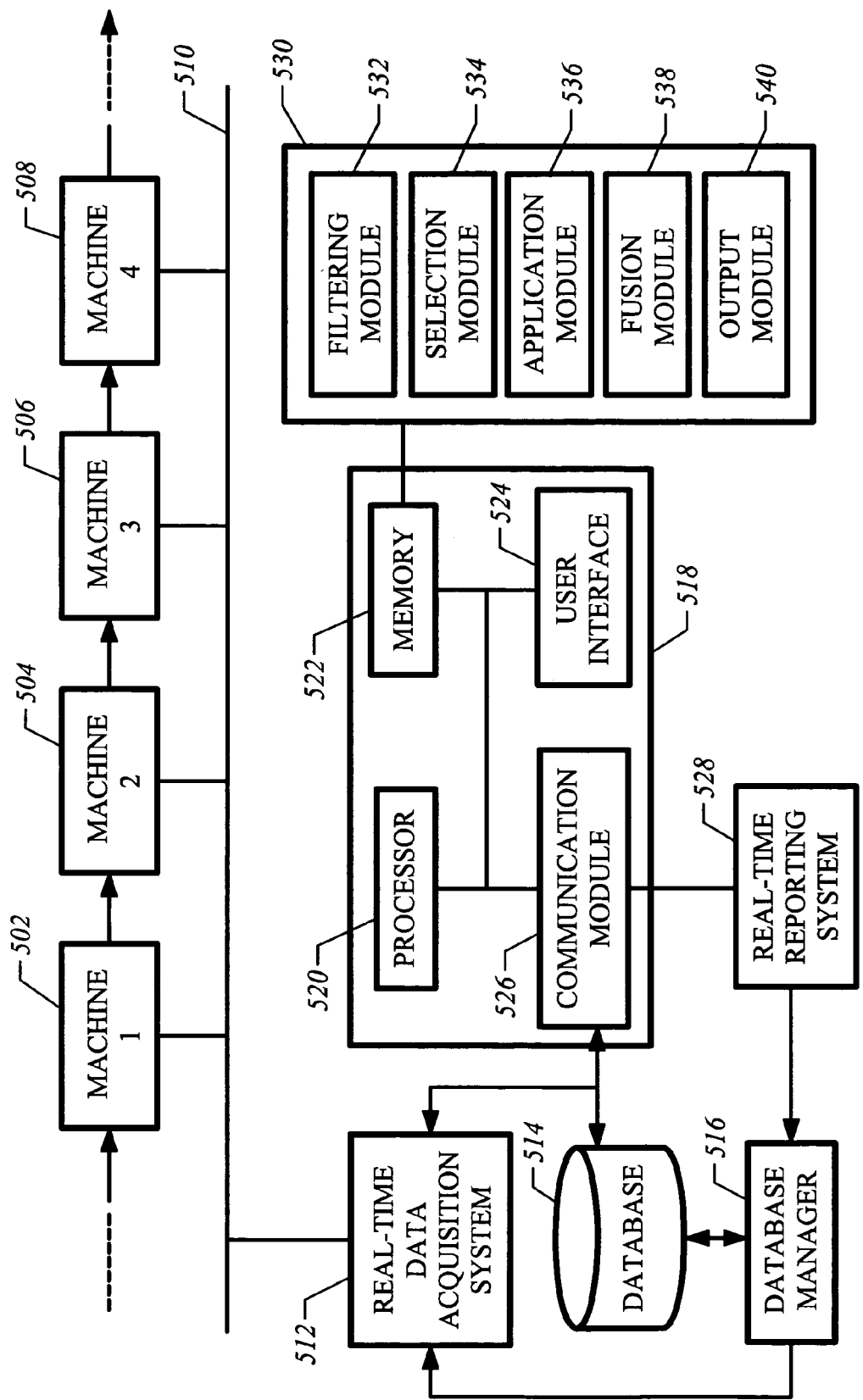
FIG. 5 depicts an embodiment of a system and apparatus including modules and units for data acquisition, data filtering, selecting and applying prediction algorithms, applying sensor fusion, and producing output.

FIG. 5 depicts an embodiment of a system and apparatus including modules and units for data acquisition, data filtering, selecting and applying prediction algorithms, applying sensor fusion, and producing output. FIG. 5 schematically shows production machines 1-4 arrayed along a line 502, 504, 506, and 508. It is understood that, while FIG. 5 shows the machines in a linear arrangement, other configurations of machines, including other numbers of machines, are within the scope of the present disclosure.

Machines 502, 504, 506, and 508 of the apparatus of FIG. 5 may include sensors, actuators and microcontrollers or programmable logic controllers (PLCs) to support machine operations and provide data via network 510 to a real-time data acquisition system 512. Network 510 may be a wired or wireless network, using for example, Ethernet or fiber optic cable, or infrared, Bluetooth or other wireless local area network (WLAN) technology. It is understood that other network technologies that may be employed as part of the overall prediction framework as data conduit are included within the scope of the present disclosure.

Machines 502-508, as mentioned above, provide data to real-time data acquisition system 512. The real-time data acquisition system may be in communication with a database 514 which may be managed by a database manager application 516. Database manager application 516 may in addition communicate with read-time data acquisition system 512. Database 514 may in addition be in communication with a computing unit 518, as discussed below.

The computing unit 518 may include a processor 520 for executing instructions to carry out steps of the method, a memory 522, a user interface 524, and a communication module 526. User interface 524 may be adapted to accept user input via a keyboard, mouse or other pointing device, stylus, voice recognition, or other input mode. User interface 524 may also be adapted to provide user output for example by rendering graphical data to a display screen, or by providing text output to a display screen or to a printer. Communication module 526 may be configured to communicate with database 514, and may also be configured to communicate with a real-time reporting system 528. Real-time reporting system may be in communication with database manager 516. As shown in FIG. 5, processor 520, memory 522, user interface 524, and communication module 526 are interconnected within computing unit 518.

Continuing with the discussion of computing unit 518, memory 522 may include modules 530 to provide instructions to processor 520 to carry out steps of the method. The modules 530 may include a filtering module 532, a selection module 534, an application module 536, a fusion module 538, and an output module. It is understood that other modules that may be employed are included within the scope of the present disclosure.

The filtering module 532 may be included in modules 530 for filtering data to produce filtered data. The filtering module may include instructions for removing irrelevant and redundant data, managing data integrity, and filtering data according to a data type classification. The filtering module may in addition include instructions for removing timeouts and idle time, for filtering multiple episode events, and for real-time schedule detection. It is understood that additional filtering instructions that may be employed are included within the scope of the present disclosure.

The selection module 534 may be included in modules 530 for selecting a first prediction method and a second prediction method. The selection module may provide for selecting the first prediction method and the second prediction method from among a choice of a time-frequency analyzer, a wavelet analyzer, a curve fitting tool, an auto-regressive model, a neural networks model, a temporal data mining method, a frequent episode discovery method, and a Bayesian reasoning model. It is understood that the selection module 534 may in addition be for selecting additional prediction methods.

The application module 536 may be included in modules 530 for applying the first prediction method to the filtered data to obtain a first prediction, and for applying the second prediction method to the filtered data to obtain a second prediction. It is understood that the application module 536 may also be for applying additional selected prediction methods to the filtered data to obtain additional predictions. A fusion module 538 may be provided for applying multivariable sensor fusion to combine the first prediction and the second prediction. For example, the first prediction may be a discrete-valued first prediction having a first magnitude of error and the second prediction may be a continuous-valued second prediction having a second magnitude of error, and the fusion module may apply multivariable sensor fusion to combine the discrete-valued first prediction and the continuous-valued second prediction to produce a combined prediction having a combined magnitude of error less than the first magnitude of error and less than the second magnitude of error. The fusion module 538 may be adapted to combine one or more additional predictions with the first prediction and the second prediction using multivariable sensor fusion.

The output module 540 for producing output may be included among the modules 530. The output module 540 may be adapted to produce output in the form of graphics or text reports. Output may in addition be in the form of maintenance warning and alarms. Forms of output that may be produced by the output module 540 have been discussed above in connection with FIG. 1.

FIG. 6 shows how faults may be prioritized in an embodiment of the system and method described herein. FIG. 6 may also provide an example of a maintenance prioritization report (see 150, FIG. 1). The tabulation of FIG. 6 shows prioritized fault data as may be gathered during manufacturing operations in a production facility, along with predicted downtimes, fault counts or frequencies, and mean times to repair. In the table, column 1 identifies the fault or event with an event code, for example, EV83. Column 2 shows the overall rank of the fault. Column 3 lists the rank of the fault, when fault frequency, that is, numbers of faults occurring within a given time, is used as the ranking criterion. Column 4 shows the rank of the fault when the average downtime or mean time to repair (MTTR) is used as the criterion for ranking the fault. Column 5 shows the fault rank when total downtime (DTM) for that fault is used as the criterion for ranking the fault.

It is understood that the overall priority may include the effects of weighting fault code data according to for example, production line structure or other exogenous inputs. All the fault data may be considered for prediction, with different weights for different faults, or faults from different machines. Typically, weighting may be carried out across machines, and data may be weighted according to, for example, machine cycle time. In another case, the data may be weighted to account for structure of the production line. For example, if the production line is split into parallel lines, data from machines on each parallel line may be accorded weights of one half, with respect to data from machines on the production line upstream of the split. There may be other reasons as well for assigning fault code data different uniform weights across machines. Overall priority may in addition include adjustment for the reliability of previous rank or priority predictions for the same fault code.

Column 6 lists the value of the total downtime, in hour:minute:second format, for that fault. Column 7 lists MTTR in hour:minute:second format for the fault, while column 8 lists the number of occurrences, or counts, for the fault. The MTTR in column 7 is the ratio of the total downtime of column 6 and the count listed in column 8.

Column 9 shows the prediction confidence as may be determined by the steps described above. The last column lists whether the fault is deemed predictable or not predictable by the application.

As an example of the table format just described, the top row of data contains entries for the fault having error code EV83. As listed in the table, fault EV83 has the highest overall priority (column 2). It is ranked 15$^{th}$ in frequency (column 3), occurring 75 times (column 8). In terms of average downtime or MTTR, its rank is 5 (column 4), with an average downtime of 19:28 (column 7). In terms of total downtime, it has rank 4 (column 5), with DTM of 24:19:27 seconds (column 6). In a similar way, the additional rows of data provide entries for other faults. Referring to the second column, it can be seen that the table includes data for the top 30 faults in terms of overall priority.

As previously discussed, fault data may be analyzed according to different data analysis or prediction methods. The prediction methods used for particular entries in the table of FIG. 6 are shown in gray scale according to the legend at the lower left of the figure, as either predictor 1, predictor 2, predictor 3, or a combination of predictor 2 or 3 with predictor 1.

The final three lines of the table provide measures of data predictability. In the first of the final three lines, faults which are predictable, according to the last column of the table, are summed according to downtime (to give 342:12:50), according to MTTR (0:05:58), and according to count (3476). Twenty-three of the thirty faults included in the table are deemed predictable. In the last of the final three lines, total values are provided. Thus, the top thirty faults, when ranked according to overall priority, provided a total event count of 6182, a total downtime of 703:25:18, and an average downtime of 0:06:50.

Data in the table may provide more effective guidance for prioritization of maintenance efforts. A fault which ranks high according to all ranking criteria, that is, in columns 2-5 of the table of FIG. 6, would therefore be accorded a high maintenance priority. Faults which rank high in several ranking criteria, as do the faults associated with error codes EV83 and EV13, for example, would likely have the higher maintenance priority among the faults listed in the table. It is understood that the tabulated data provides a tool for maintenance prioritization.

Accordingly, the method, system, and apparatus as described above may provide prediction tools and methods for data analysis according to multiple criteria to produce output according to a variety of output options. Data with different characteristics, for example, discrete-valued, continuous-valued, or even hybrid data, may be analyzed. Predictions made using different prediction methods may be combined using multivariable data fusion and/or techniques like fuzzy integrals to reduce prediction uncertainties or otherwise improve the usefulness of the predictions. A fuzzy integral technique or other technique employing fuzzy set membership functions may be useful in data fusion of categorical-valued data, for example, have as value an attribute such as HOT, MEDIUM, or COLD. Reports may be produced in a variety of formats and tailored to different ends.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer usable medium having computer readable program code facilitating a method for data analysis, the method comprising:
    processing data with a plurality of prediction algorithms to produce prediction values, the prediction values having associated prediction confidence intervals;
    evaluating historical and expected performance of the prediction algorithms to generate performance indexes, the performance indexes having associated index confidence intervals;
    generating relevance values of the prediction algorithms based on the performance indexes and index confidence intervals;
    applying the relevance values and prediction confidence intervals to combine prediction values based on a weighting of each of the prediction algorithms;
    applying multivariable data fusion to combine the prediction values thereby providing a combined prediction value; and producing output representative of the combined prediction value having improved prediction accuracy as compared to the prediction values.

2. The computer usable medium of claim 1, wherein processing data to produce prediction values comprises:
    processing data with a plurality of prediction algorithms to produce prediction functions, the prediction functions having associated prediction confidence intervals; and
    evaluating the prediction functions to produce associated values for predictions and indexes.

3. The computer usable medium of claim 1, further comprising:
    filtering data to produce filtered data;
    wherein processing a plurality of prediction algorithms to produce prediction values comprises:
    applying the plurality of prediction algorithms to the filtered data.

4. The computer usable medium of claim 3, wherein filtering data comprises:
    executing a filtering algorithm from a list of filtering options comprising removing irrelevant and redundant data, managing data integrity, and filtering data according to data type classification.

5. The computer usable medium of claim 3, wherein filtering data comprises:
    executing a filtering algorithm from a list of filtering options comprising filtering multiple episode events, filtering fault data according to real-time schedule detection, and filtering fault data according to fault type classification.

6. The computer usable medium of claim 1, wherein processing a plurality of prediction algorithms comprises:
    making a selection from a list of prediction options comprising a time-frequency analyzer, a wavelet analyzer, a curve fitting tool, an auto-regressive model, a neural networks model, a temporal data mining method, a frequent episode discovery method, and a Bayesian reasoning model.

7. The computer usable medium of claim 1, wherein producing output comprises:
    choosing from a list of output options comprising a short term prediction report, a long term prediction report, a prognostics report, a fault cross-correlation report, a maintenance prioritization report, fault trend estimation, maintenance warning and alarms, knowledge extraction, a fault forecasting report, a historical prediction-performance report, and a prediction confidence metric report.

8. The computer usable medium of claim 1, wherein a first prediction algorithm produces a first prediction value of a first particular type and having a first magnitude of error and a second prediction algorithm produces a second prediction value of a second particular type and having a second magnitude of error, and applying multivariable sensor fusion comprises:
    combining the first prediction value of the first particular type and the second prediction value of the second particular type to produce a combined prediction value having a combined magnitude of error less than the first magnitude of error and less than the second magnitude of error.

9. The computer usable medium of claim 1, further comprising:
    correcting for systematic errors in the prediction values.

10. The computer usable medium of claim 9, wherein correcting for systematic errors comprises:
    applying at least one of a proportional-integral-derivative and a non-linear controller.

11. A computer usable medium having computer readable program code configured to facilitate a method for fault data analysis, the method comprising:
    acquiring fault data using a real-time data acquisition system;
    filtering the fault data to produce filtered fault data;
    selecting a plurality of fault prediction methods;
    applying the plurality of fault prediction methods to the filtered fault data to obtain a plurality of prediction values;
    applying multivariable sensor fusion to combine the plurality of prediction values based on performance indices of associated prediction algorithms of the fault prediction methods; and
    producing output.

12. The computer usable medium of claim 11, further comprising:
    correcting the prediction values according to historical data and to a definable prediction accuracy.

13. The computer usable medium of claim 11, wherein filtering fault data comprises:

executing a filtering algorithm from a list of filtering options comprising removing irrelevant time outs and idle time events from data, removing irrelevant and redundant data, managing data integrity, filtering multiple episode events, filtering data according to real-time schedule detection, and filtering data according to fault type classification.

14. The computer usable medium of claim 11, wherein selecting a plurality of prediction methods comprises:

making selections from a list of prediction options comprising a time-frequency analyzer, a wavelet analyzer, a curve fitting tool, an auto-regressive model, a neural networks model, a temporal data mining method, a frequent episode discovery method, and a Bayesian reasoning model.

15. The computer usable medium of claim 11, wherein the plurality of prediction values comprise a discrete-valued first prediction value having a first magnitude of error and a continuous-valued second prediction value having a second magnitude of error, and applying multivariable sensor fusion comprises:

combining the discrete-valued first prediction value and the continuous-valued second prediction value to produce a combined prediction value having a combined magnitude of error less than the first magnitude of error and less than the second magnitude of error.

16. The computer usable medium of claim 11, wherein producing output comprises:

choosing from a list of output options comprising a short term prediction report, a long term prediction report, a prognostic report, a fault cross-correlation report, a maintenance prioritization report, fault trend estimation, maintenance warning and alarms, knowledge extraction, a fault forecasting report, a historical prediction performance report, a prediction confidence metric report, and a maintenance error code database correlation report.

17. A computer system responsive to computer executable instructions for data analysis, comprising:

a filtering module for filtering data to produce filtered data;

a selection module for selecting a first prediction method and a second prediction method;

an application module for applying the first prediction method to the filtered data to obtain a first prediction value, and for applying the second prediction method to the filtered data to obtain a second prediction value;

a fusion module for applying multivariable sensor fusion to combine the first prediction value and the second prediction value based on performance indices of associated prediction algorithms of the first and second prediction methods; and an output module for producing output.

18. The computer system of claim 17, wherein the filtering module is further for removing irrelevant and redundant data, managing data integrity, and filtering data according to data type classification.

19. The computer system of claim 17, wherein the selection module is further for selecting the first prediction method and the second prediction method from among a choice of a time-frequency analyzer, a wavelet analyzer, a curve fitting tool, an auto-regressive model, a neural networks model, a temporal data mining method, a frequent episode discovery method, and a Bayesian reasoning model.

20. The computer system of claim 17, wherein the first prediction value is a discrete-valued first prediction value having a first magnitude of error and the second prediction is a continuous-valued second prediction value having a second magnitude of error, and the fusion module is further for combining the discrete-valued first prediction value and the continuous-valued second prediction value to produce a combined prediction value having a combined magnitude of error less than the first magnitude of error and less than the second magnitude of error.

* * * * *